United States Patent
Leibovitch

(10) Patent No.: US 9,809,374 B2
(45) Date of Patent: Nov. 7, 2017

(54) CONTAINER FOR MIXABLE POWDER OR LIQUIDS

(71) Applicant: Ariel Leibovitch, Herzlia (IL)

(72) Inventor: Ariel Leibovitch, Herzlia (IL)

(*) Notice: Subject to any disclaimer, the term of this patent is extended or adjusted under 35 U.S.C. 154(b) by 0 days.

(21) Appl. No.: 14/868,406

(22) Filed: Sep. 29, 2015

(65) Prior Publication Data

US 2016/0096673 A1    Apr. 7, 2016

Related U.S. Application Data

(60) Provisional application No. 62/058,119, filed on Oct. 1, 2014.

(51) Int. Cl.
*B65D 25/08* (2006.01)
*B65D 81/32* (2006.01)
(Continued)

(52) U.S. Cl.
CPC ............ *B65D 81/3222* (2013.01); *A23L 2/39* (2013.01); *A23L 2/52* (2013.01); *A23P 10/40* (2016.08); *A61J 1/20* (2013.01); *A61J 9/008* (2013.01); *B65D 1/04* (2013.01); *B65D 41/16* (2013.01); *B65D 43/021* (2013.01); *B65D 43/0231* (2013.01); *B65D 51/243* (2013.01); *B65D 81/3255* (2013.01); *A23V 2002/00* (2013.01); *A61J 1/2093* (2013.01); *A61J 11/04* (2013.01); *B65D 2543/0024* (2013.01); *B65D 2543/0049* (2013.01); *B65D 2543/0074* (2013.01); *B65D 2543/00092* (2013.01); *B65D 2543/00296* (2013.01); *B65D 2543/00314* (2013.01); *B65D 2543/00351* (2013.01); *B65D 2543/00537* (2013.01); *B65D 2543/00629* (2013.01); *B65D 2543/00685* (2013.01); *B65D 2543/00796* (2013.01)

(58) Field of Classification Search
CPC .. B65D 81/3222; B65D 81/325; B65D 41/16; B65D 1/04; B65D 81/3255; A23P 10/40; A61J 1/20; A61J 9/008
USPC ....... 206/219, 220, 221; 215/264, 315, 11.4, 215/311, 307, 228; 222/145.1, 145.4, 222/145.6, 134

See application file for complete search history.

(56) References Cited

U.S. PATENT DOCUMENTS 4,585,149 A * 4/1986 Zulauf ............... B65D 81/3244
222/144.5
5,353,964 A * 10/1994 Liu ....................... A61J 7/0046
215/11.4

(Continued)

OTHER PUBLICATIONS

International Search Report for application PCT/IB2015/057441 dated Jan. 28, 2016.

*Primary Examiner* — J. Gregory Pickett
*Assistant Examiner* — Rafael Ortiz
(74) *Attorney, Agent, or Firm* — Roach Brown McCarthy & Gruber, P.C.; Kevin D. McCarthy

(57) ABSTRACT

A removable container for powder or liquid includes a housing, a spilling mechanism and a bypass element. The housing hangs within a bottle and is capable of storing powder within the bottle while being sealed from a precursor liquid held within the bottle. The spilling mechanism enables the powder to spill out of the housing and into the precursor liquid and the bypass element provides the precursor liquid out of the bottle without mixing with the stored powder.

8 Claims, 12 Drawing Sheets

(51) Int. Cl.

| | |
|---|---|
| *A23L 2/52* | (2006.01) |
| *A61J 1/20* | (2006.01) |
| *B65D 1/04* | (2006.01) |
| *B65D 41/16* | (2006.01) |
| *B65D 43/02* | (2006.01) |
| *B65D 51/24* | (2006.01) |
| *A61J 9/00* | (2006.01) |
| *A23L 2/39* | (2006.01) |
| *A23P 10/40* | (2016.01) |
| *A61J 11/04* | (2006.01) |

(56) References Cited

U.S. PATENT DOCUMENTS

| | | |
|---|---|---|
| 5,634,714 A | 6/1997 | Guild |
| 5,794,802 A | 8/1998 | Caola |
| 5,950,819 A | 9/1999 | Sellars |
| 6,921,087 B2 | 7/2005 | Takahashi et al. |
| 7,874,420 B2 * | 1/2011 | Coon ................. B65D 81/3222 206/219 |
| 2004/0112770 A1 | 6/2004 | Oswald |
| 2009/0133366 A1 | 5/2009 | Cronin et al. |
| 2009/0301905 A1 | 12/2009 | Bullard et al. |
| 2011/0024454 A1 | 2/2011 | Drybye et al. |
| 2011/0073501 A1 * | 3/2011 | Wu ......................... A61J 1/065 206/219 |

* cited by examiner

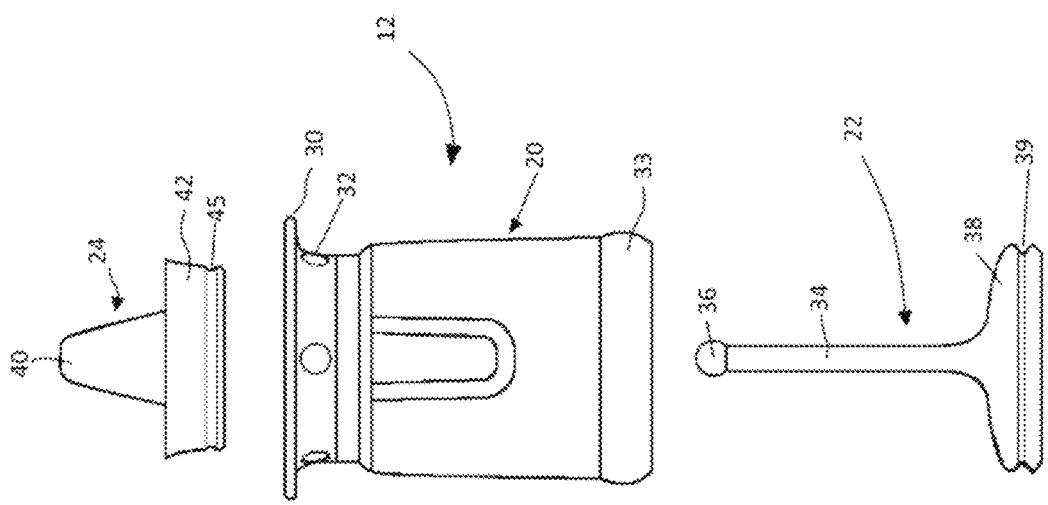
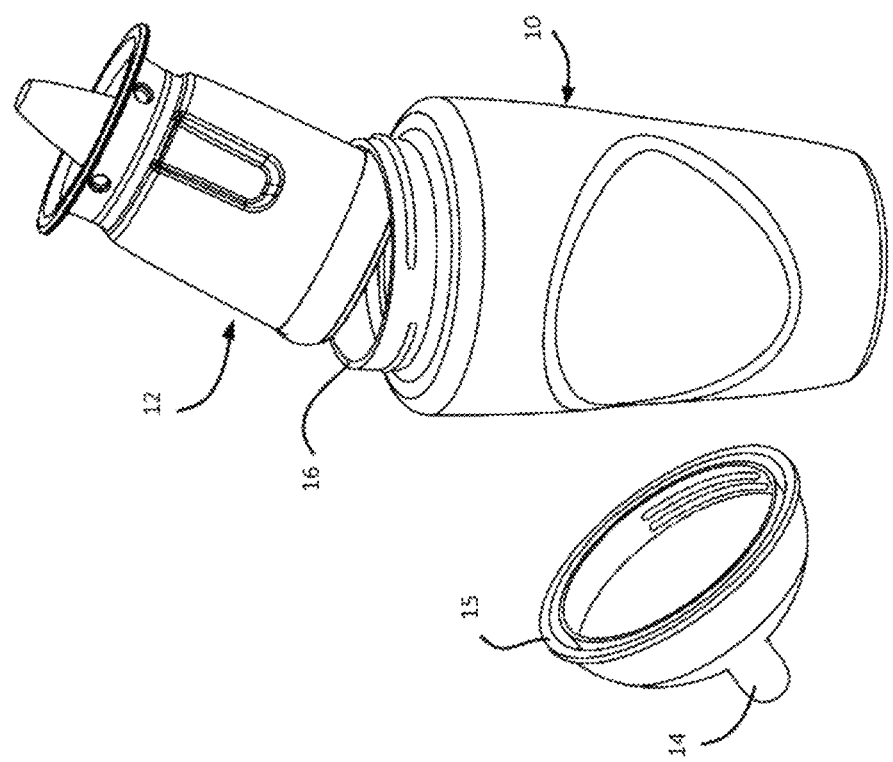

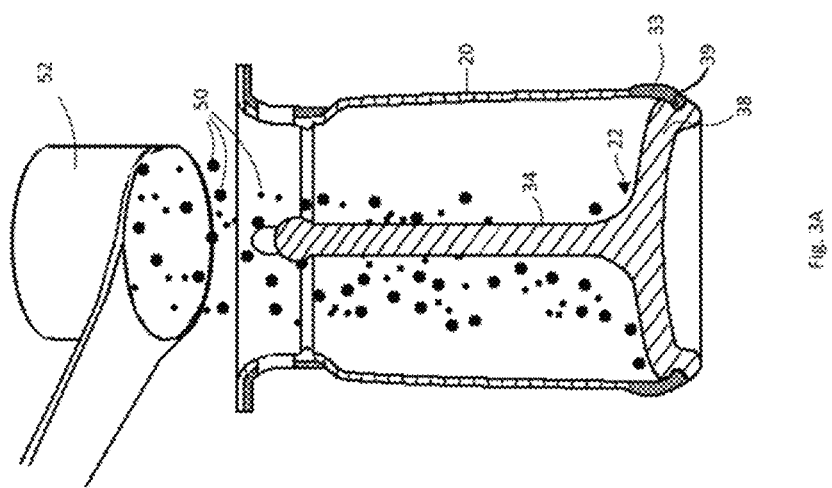

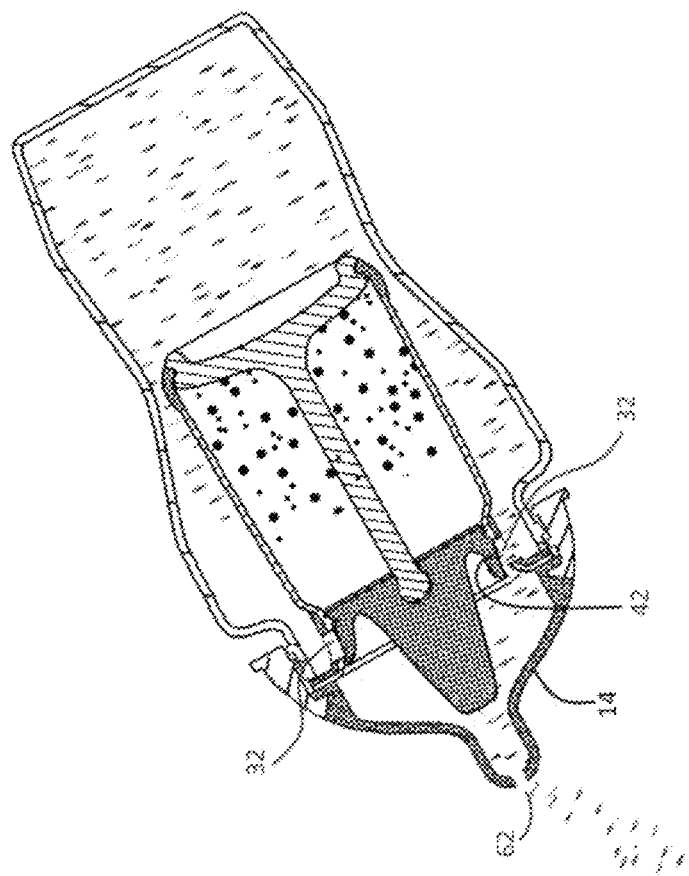
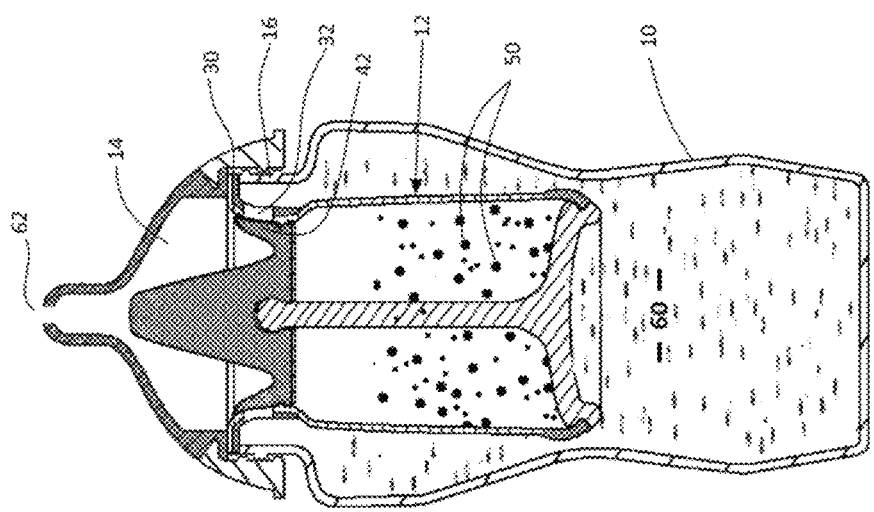

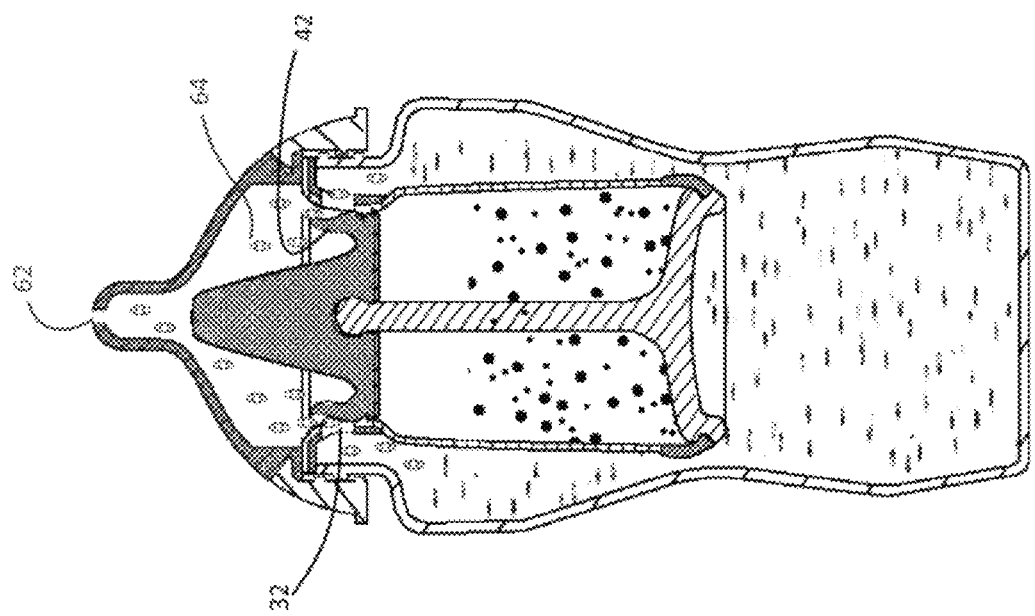

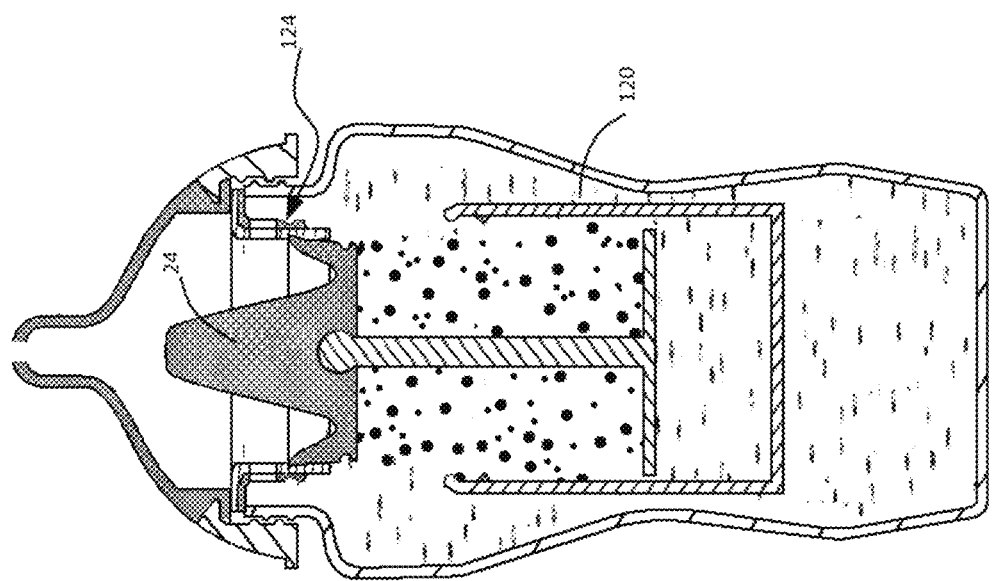

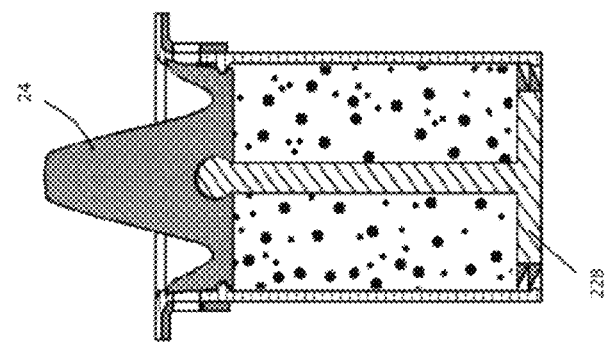
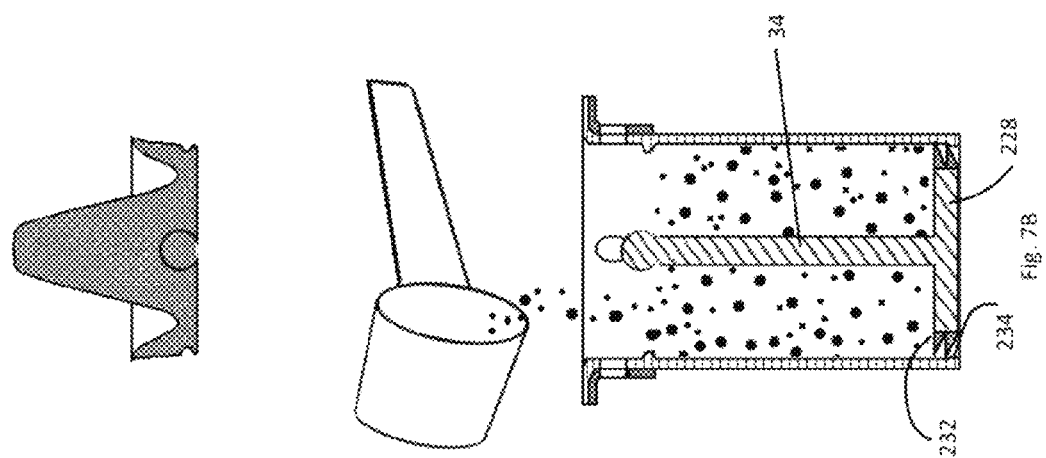
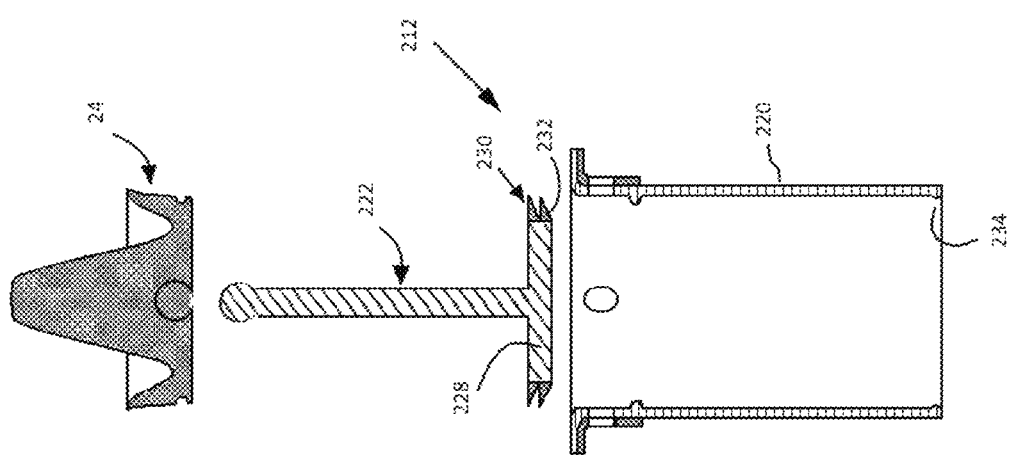

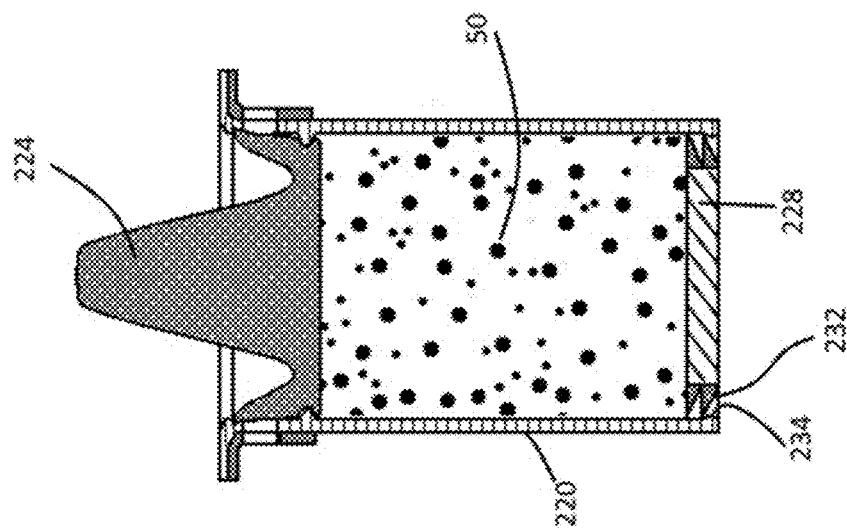
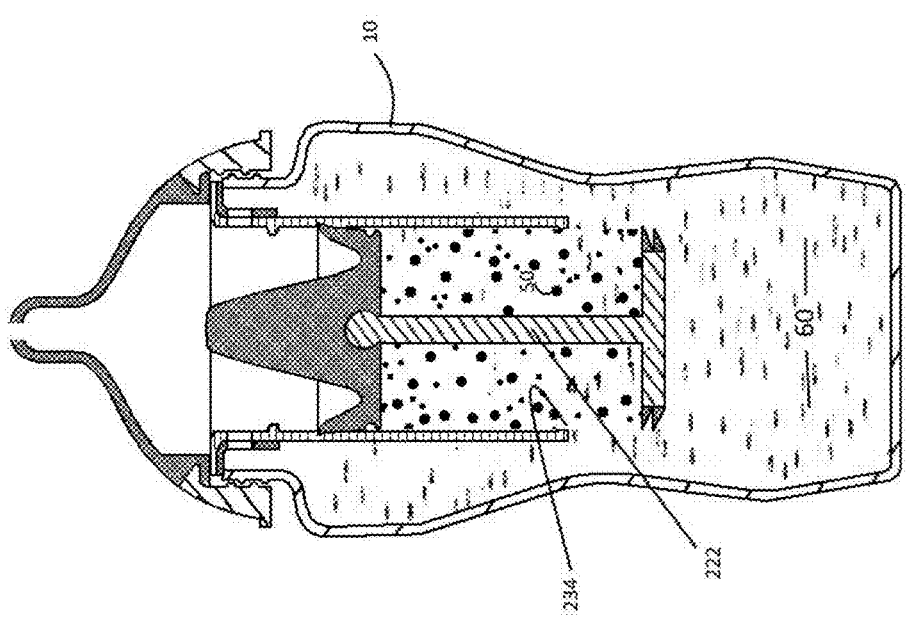

CONTAINER FOR MIXABLE POWDER OR LIQUIDS

CROSS-REFERENCE TO RELATED APPLICATIONS

This application claims benefit from U.S. Provisional Patent Application No. 62/058,119, filed Oct. 1, 2014, which is hereby incorporated by reference.

FIELD OF THE INVENTION

The present invention relates to containers for mixable powders or liquids generally.

BACKGROUND OF THE INVENTION

There are many situations when a mixable powder needs to be mixed with water. For example, powdered medicines, such as antibiotics, are mixed with sterile water in a medicine bottle. In another example, baby formula is added to sterile water in a baby bottle.

Many products and patents exist to enable these powders to be mixed. Some store the powders separately from the bottles or containers while others provide a two section bottle with a mechanism to add the powder to the liquid. One such mechanism breaks a barrier between the two sections, another pushes a surface out of the way.

SUMMARY OF THE PRESENT INVENTION

There is therefore provided, in accordance with a preferred embodiment of the present invention, a removable container for powder or liquid. The container includes a housing, a spilling mechanism and a bypass element. The housing hangs within a bottle on a rim of the bottle and is capable of storing the powder or liquid within the bottle. The housing is sealed from a precursor liquid held within the bottle. The spilling mechanism enables the powder or liquid to spill out of the housing and into the precursor liquid. The bypass element provides the precursor liquid out of the bottle without mixing with the stored powder or liquid.

Moreover, in accordance with a preferred embodiment of the present invention, the container also includes release elements to provide an exit path for steam.

Further, in accordance with a preferred embodiment of the present invention, the container also includes circulation elements to enable the precursor liquid to mix with the powder or liquid.

Still further, in accordance with a preferred embodiment of the present invention, the bottle includes a nipple and the spilling mechanism includes a cap shaped to be pressed down through the nipple.

Moreover, in accordance with a preferred embodiment of the present invention, the housing includes an open-ended canister having an upper lip to which a flexible cap is snap-fittable, the upper lip to rest on the rim and a bottom snap-fittable into a lower end of the open-ended canister. The spilling mechanism also includes a rod, integrally formed with the bottom, which rod is snap-fittable into the flexible cap. The bottom is pushably releasable from the open-ended canister when pushed, via the rod, by the flexible cap thereby to release the powder or liquid into the bottle.

Further, in accordance with a preferred embodiment of the present invention, the removable container also includes a rubber ring to seal the bottom to the open-ended canister. The rubber ring can be connectable to the bottom or to the canister.

Furthermore, in accordance with a preferred embodiment of the present invention, the housing includes a ring having an upper lip to which the flexible cap is snap-fittable. The upper lip rests on the rim. The spilling mechanism includes a closed canister connectable to the ring and a piston, which piston is snap-fittable into the flexible cap. The closed canister is pushably releasable from the ring when the closed canister is pushed by the piston cap thereby to release the powder or liquid into the bottle.

Further, in accordance with a preferred embodiment of the present invention, the powder or liquid can be a nutritional formula, a powdered chemical, or a medicine.

Still further, in accordance with a preferred embodiment of the present invention, the spilling mechanism includes a flat cap.

Moreover, in accordance with a preferred embodiment of the present invention, the spilling mechanism includes a flat-bottomed cap to press said powder or liquid out of said liquid.

There is also provided, in accordance with a preferred embodiment of the present invention, a removable container for powder or liquid which includes a canister, a flexible cap and a release mechanism. The canister is capable of sealingly storing an amount of powder or liquid and includes multiple elements connectable together. The elements include at least an upper lip to rest on a rim of a bottle. The flexible cap is snap-fittable into an upper end of the canister. The release mechanism separates at least two of the multiple elements of the canister when the flexible cap is pushed into the canister thereby to release the powder into the bottle.

There is also provided, in accordance with a preferred embodiment of the present invention, a method for creating a solution from a powder or a liquid. The method includes placing a removable container storing the powder or liquid onto the rim of a bottle of precursor liquid, pressing down on a cap forming part of a spilling mechanism of the removable container to push the powder or liquid down into the bottle, the pressing causing elements of the spilling mechanism to fall into the bottle, shaking the bottle with the elements therein thereby to mix the solution and drinking the solution from the bottle with the elements within the bottle.

Further, in accordance with a preferred embodiment of the present invention, the method also includes having release elements in said removable container to provide an exit path for steam.

Finally, in accordance with a preferred embodiment of the present invention, the method also includes having circulation elements to enable said precursor liquid to mix with said powder or liquid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is which is a schematic illustration of a baby bottle with a removable powder container, constructed and operative in accordance with a preferred embodiment of the present invention;

FIG. 2 is an expanded view illustration of the removable powder container of FIG. 1;

FIGS. 3A, 3B and 3C are schematic illustrations showing how the removable container of FIG. 2 may be filled with powder;

FIGS. 4A, 4B and 4C are schematic illustrations of three states of the removable container of FIG. 2 within the bottle;

FIGS. 6A, 6B, 6C, 6D and 6E are schematic illustrations of an alternative embodiment of the removable powder container of the present invention;

FIGS. 7A, 7B, 7C and 7D are schematic illustrations of a further alternative embodiment of the present invention;

FIG. 8 is a schematic illustration of a still further embodiment of the present invention.

Figure 3C:
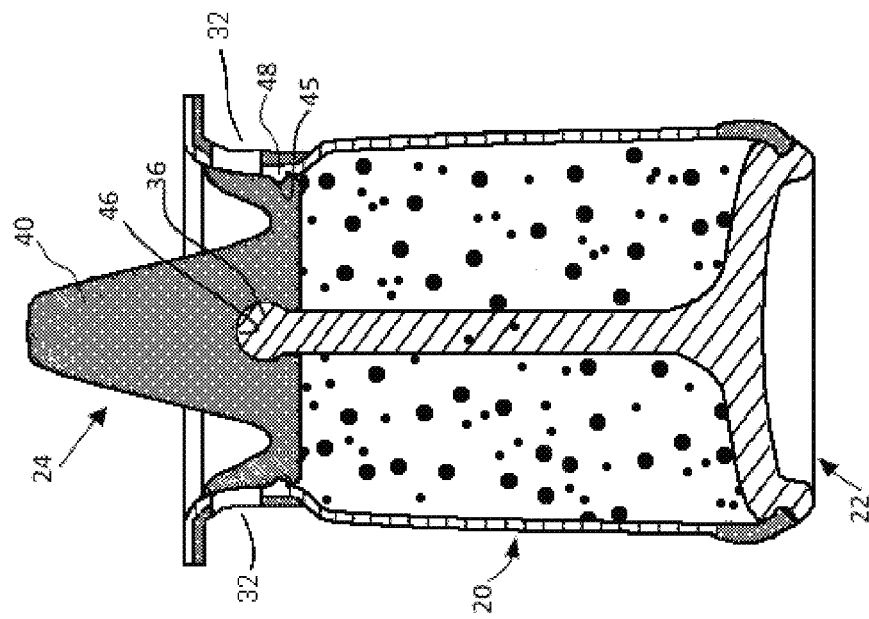

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that adding powder or liquid to a bottle of liquid is an awkward process. This is particularly true for adding baby powder to a baby bottle full of water. Moreover, there is a need to create such a mixture when traveling, particularly in order to keep the mixture fresh.

Applicants have realized that a removable container which may store powder within a bottle and may release it into the bottle when desired may be advantageous. Powder may be placed in the removable container of the present invention prior to traveling and prior to placing the container into the bottle. The removable container may be removed after use for cleaning and for refilling. Moreover, removable powder container 12 may not be specific to a particular type of bottle and may be moved between bottles.

The following discussion presents the present invention for storing and dispensing powder. It will be appreciated that the present invention may also be utilized for storing liquids to be dispensed at a later time. It will also be appreciated that the present invention may also be used for other types of powders or liquids, other than those for baby bottles. For example, for sports drinks, powdered medicines or industrial powders. It may be particularly useful for powders that create solutions that do not maintain their freshness for very long and/or for those which need to be utilized shortly after mixing and thus, need to be dissolved just prior to utilizing, such as, for example, baby formula or other nutritional formula, a powdered chemical or medicine, such as antibiotics.

The embodiment below shows a baby bottle; however, it will be appreciated that the present invention is operable with other types of bottles and containers as well.

Reference is now made to FIG. 1, which illustrates a baby bottle 10 with a removable powder container 12 about to be placed into bottle 10. FIG. 1 also shows a nipple 14 with a tightening ring 15 which may be added to bottle 10 after removable powder container 12 may be placed into bottle 10. Reference is also made to FIG. 2, which illustrates the elements of removable powder container 12, in an expanded view. Removable powder container 12 may comprise an open-ended canister 20, a piston-shaped removable bottom 22 and a flexible cap 24.

Open-ended canister 20 may be of any suitable size (the size shown in the figures is exemplary only) and may be formed of any suitable material which may be waterproof, such as a hard or semi-hard material, and may comprise an upper lip 30, designed to sit on a rim 16 (FIG. 1) of bottle 10, and holes 32 through which water in bottle 10 may flow around container 12 and into nipple 14 of bottle 10 when container 12 may sit on rim 16. Although not shown, upper lip 30 may be covered on its underside with a soft material, such as silicon or rubber, to seal between powder container 12 and rim 16.

Open-ended canister 20 may have a flexible ring 33 formed at the distal end from lip 30, where flexible ring 33 may be formed of any suitable flexible material, such as rubber or silicon. Flexible ring 33 may be connected to canister 20 in any suitable way, such as by co-injection, gluing, over-molding, snapping, mechanical attachments, etc.

Bottom 22 may be formed of any inflexible material, such as resin (ABS (Acrylonitrile Butadiene Styrene), PP (Polypropylene)), metal, etc., and may comprise a rod 34, a ball 36 on top of rod 34 and a base 38 having a ring-shaped indentation 39 around it. As described in more detail hereinbelow, bottom 22 may be snap-attachable into flexible ring 33 of open-ended canister 20, thereby to provide a sealed bottom to container 12.

Flexible cap 24 may be formed of any suitable soft and/or flexible material, such as rubber, silicon, TPR (ThermoPlastic Rubber), and may be integrally formed of a conic top 40 sitting within a crown 42. Flexible cap 24 may also have a ring-shaped indentation 45 toward the bottom of crown 42 which may provide a snap connection and upper seal to open-ended canister 20.

Figure 3B:
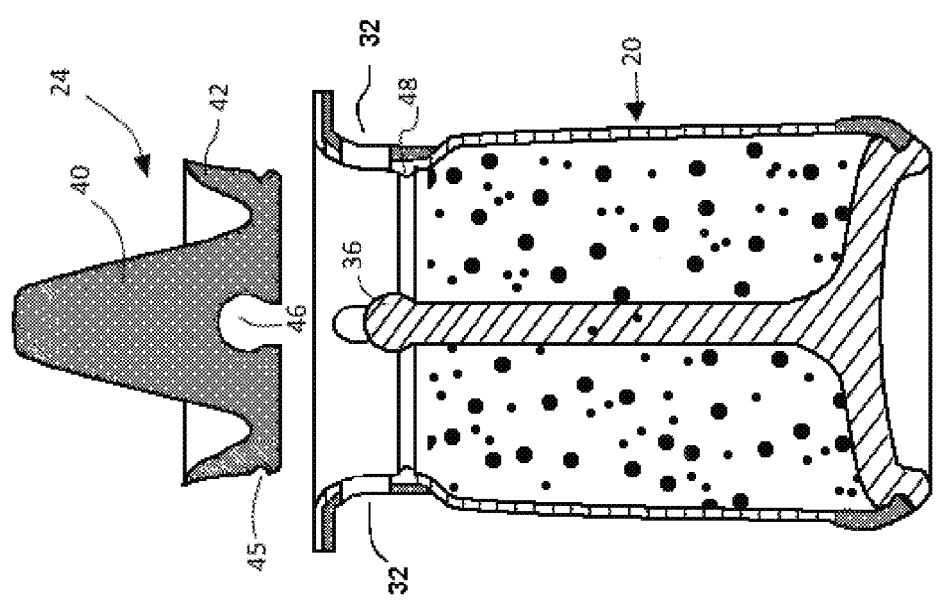

Reference is now made to FIGS. 3A, 3B and 3C, which illustrate how container 12 may be filled with powder. Initially (FIG. 3A), a user may snap bottom 22 and open-ended canister 20 together, thereby producing an open container with rod 34 extending from base 38 towards the top of canister 20. In this snapped-in state, flexible ring 33 of canister 20 may be snapped into indentation 39, thereby sealing bottom 22 into canister 20 and producing the open container. As shown in FIG. 3A, a user may then pour powder (shown as dots 50 falling from a scoop 52) into the open container.

Once the open container is sufficiently filled (FIG. 3B), the user may then place flexible cap 24 onto the top of open-ended canister 20. Cap 24 may additionally have a ball-shaped indentation 46 on its underside, which ball-shaped indentation 46 may be shaped to match the size and shape of ball 36 of bottom 22. Moreover, open-ended canister 20 may have an inwardly-protruding neck ring 48 at about the same height as ball 36.

When the user presses flexible cap 24 into open-ended canister 20, thereby to close canister 20, ball-shaped indentation 46 may snap onto ball 36, thereby to hold it, and rod 34, in place. At generally the same time, ring-shaped indentation 45 may snap onto inwardly-protruding neck ring 48, thereby to provide an upper seal to open-ended canister 20, as shown in FIG. 3C. Container 12 may now sealably hold powder 50 and may be placed within bottle 10.

Reference is now made to FIGS. 4A, 4B and 4C, which illustrate removable container 12 within bottle 10 in 3 states. The user may first fill bottle 10 with a liquid 60, such as water. The user may then place removable container 12 into bottle 10, dropping container 12 into liquid 60 until its upper lip 30 sits on the bottle's rim 16. The user may then close bottle 10 with nipple 14, typically by placing nipple 14 within ring 15 and then screwing the combination onto the bottle/container combination. The result is shown in FIG. 4A.

It will be appreciated that, in this state, powder 50 may be sealably stored within container 12 even though container 12 may be surrounded by liquid 60. Moreover, despite the fact that container 12 may enclose the opening of bottle 10, liquid 60 may still flow to and from nipple 14, as shown in FIG. 4B. When a person, such as a baby, sucks on nipple 14, a vacuum may be created which may pull liquid 60 towards nipple 14. Liquid 60 may flow through holes 32 and may push crown 42, which may be flexible, away from holes 32. The liquid may thus flow to an opening 62 in nipple 14. Similarly, as shown in FIG. 4C, holes 32 may provide an exit path for steam 64 which may occur if hot water is placed into bottle 10. The pressure of steam 64 may also push crown 42 away from holes 32. However, powder 60 may remain dry.

Figure 5B:
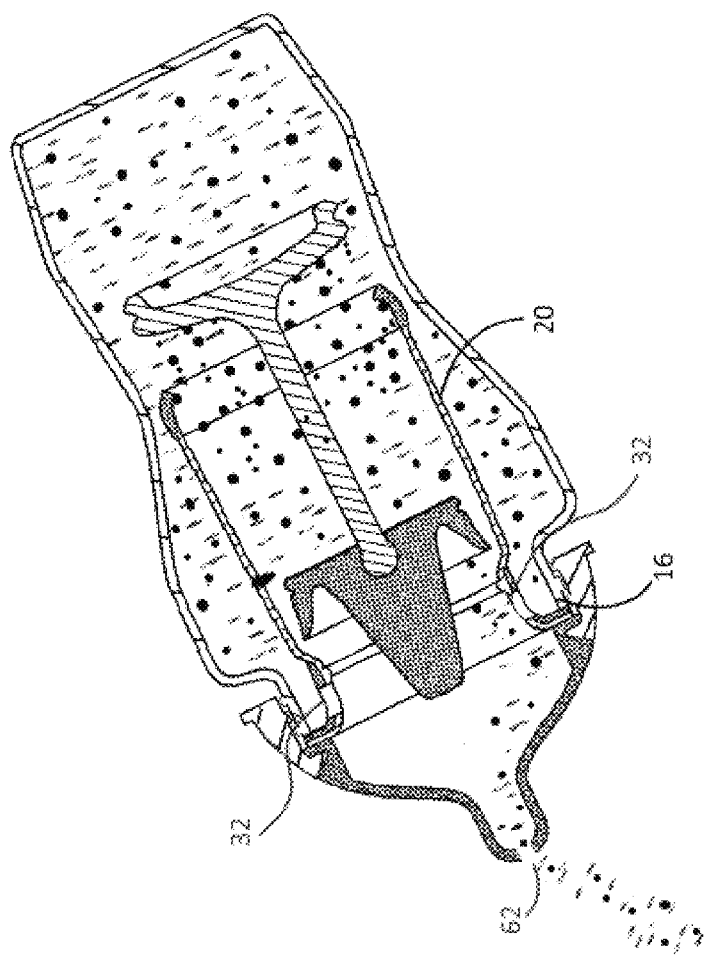
FIGS. 5A and 5B are schematic illustrations of the bottle with the removable container of FIG. 2 after dispensing the powder stored in the container.
Figure 5A:
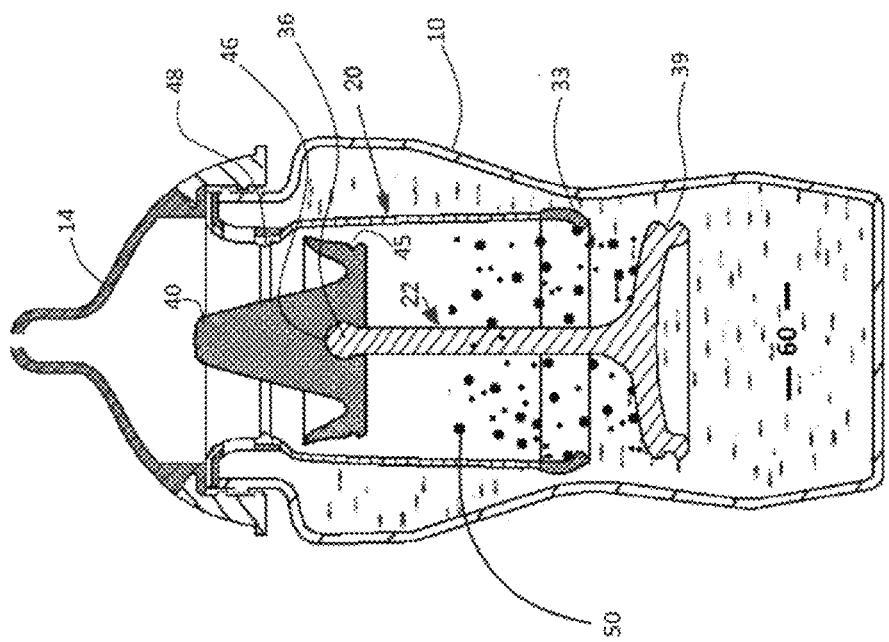

As shown in FIG. 5A, to which reference is now made, when the user may desire to utilize powder 50, the user may push down on nipple 14, thereby to push down on conic top 40 of flexible cap 24. This may release the upper seal provided by inwardly-protruding neck ring 48 and ring-shaped indentation 45. Further, since flexible cap 24 may be relatively solid and may be connected to bottom 22 via ball 36 and ball-shaped indentation 46, the user's push may push bottom 22 further into bottle 10, releasing the bottom seal provided by flexible ring 33 of canister 20 and indentation 39 of bottom 22. Cap 24 may push powder 50 out of container 12, generally completely. As a result, powder 50 may fall into liquid 60, towards the bottom of bottle 10. It will be appreciated that cap 24 and rod 34 may also fall into liquid 60.

The user may then shake bottle 10 to mix liquid 60 and powder 50, as is generally known, before providing bottle 10 to a child to drink. The released elements of container 20, which may move around during shaking, may help powder 50 to dissolve into liquid 60.

The child may tip the bottle, as shown in FIG. 5B to which reference is now made. As can be seen, container 20 may remain in place on rim 16, providing a wide sleeve, while the powder/liquid mixture may flow around the displaced elements of removable powder container 12, into nipple 14. The elements of removable powder container 12 may remain in bottle 10 until they may be removed from bottle 10 for cleaning. It will be appreciated that there is no need to remove them in order to create the mixture nor for drinking it. They only need to be removed for cleaning.

It will be appreciated that the present invention may provide a removable container for powder or liquid that may keep the powder or liquid fresh until it needs to be used. Moreover, mixing the powder or liquid is simple and straightforward, even in awkward situations.

Removable container 20 may fit onto multiple types of bottles since it has no threading to attach to bottle 10; instead, it merely hangs within bottle 10, storing powder 50 (or a liquid) but keeping it sealed from precursor liquid 60 within bottle 10. Despite the fact that container 20 may occupy the mouth of bottle 10, container 20 may include bypass elements to provide liquid 60 out of bottle 10 without mixing with stored powder 50. And container 20 may also include a release element to provide an exit path for steam which may be generated if hot water is placed into bottle 10 and circulation elements to help liquid 60 to mix well with powder 50 so that no chunks of powder remain after mixing. The circulation elements may include holes 32 and the actions of rod 34, base 38 and flexible cap 24 which fall into bottle 10 as well as the fact that powder 50 falls into bottle 10 from generally its top area. Rod 34, base 38 and flexible cap 24 are thus free to move around in bottle 10 and aid in pushing powder 50 out of container 20, as well as in circulating powder 50 and in helping it to dissolve into liquid 60.

It will be appreciated that removable container 20 may also comprise a spilling mechanism, which may comprise flexible cap 24 and other elements, to enable powder 50 to spill out of the housing and into liquid 60. Spilling mechanism may operate through nipple 14, such that the user may press down on flexible cap 24 through nipple 14. Reference is now made to FIGS. 6A, 6B, 6C, 6D and 6E, which illustrate an alternative embodiment of the removable powder container of the present invention. In this embodiment, the powder container, labeled 112 in the expanded view of FIG. 6A, may comprise a closed canister 120, a piston 122, a ring 124 and flexible cap 24.

Ring 124 may have similar elements to the upper section of open-ended canister 20 of the previous embodiment. Thus, ring 124 may comprise upper lip 30, holes 32 and inwardly-protruding neck ring 48. In addition, ring 124 may comprise a ring-shaped indentation 132 on its outer surface.

Canister 120 may snap-connect to ring 124 (via an inwardly-protruding tip 131 on canister 120 and ring-shaped indentation 132 on the outer surface of ring 124,), thereby to produce a canister to receive flexible cap 24 and to sit on rim 16 of bottle 10. The resultant canister may be sealed with inwardly-protruding ring 130, formed of an elastic material such as rubber or silicon), as shown in FIG. 6D.

Figure 6B:
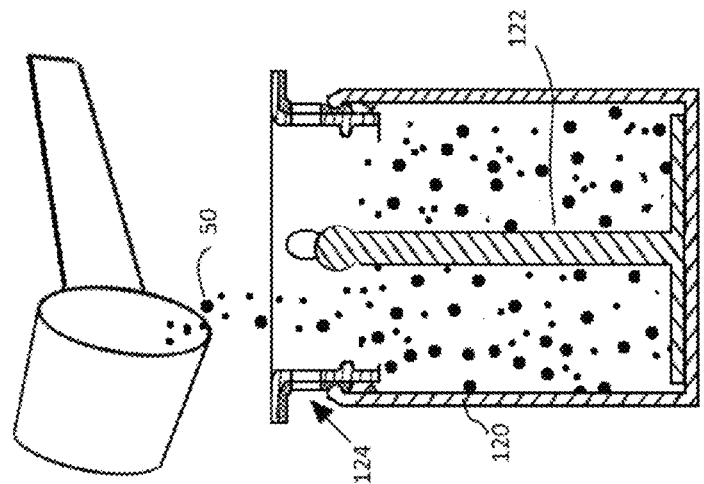
Figure 6A:
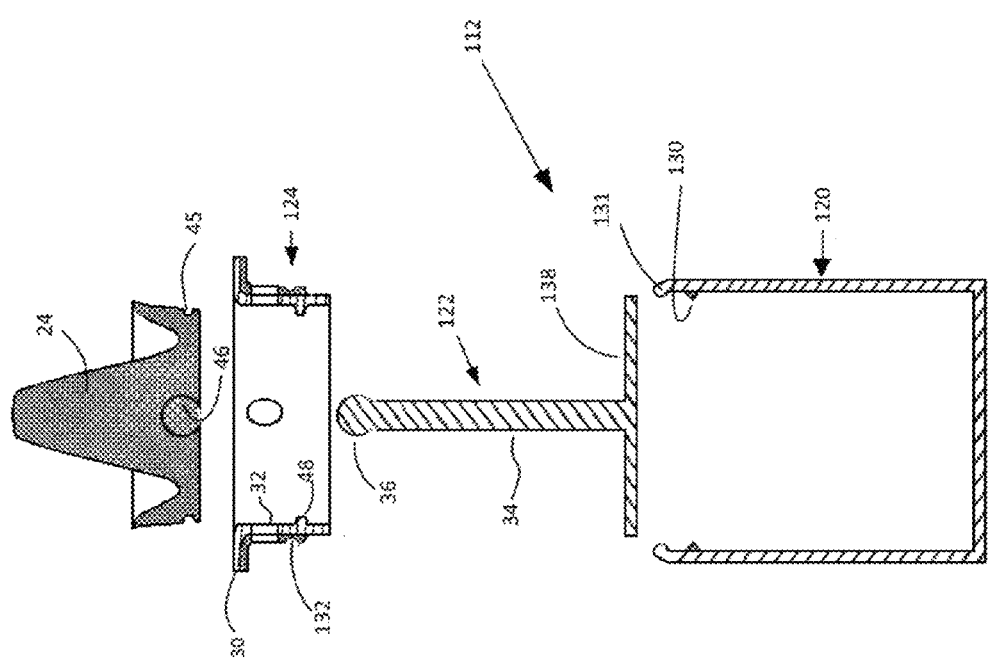
Figure 6D:
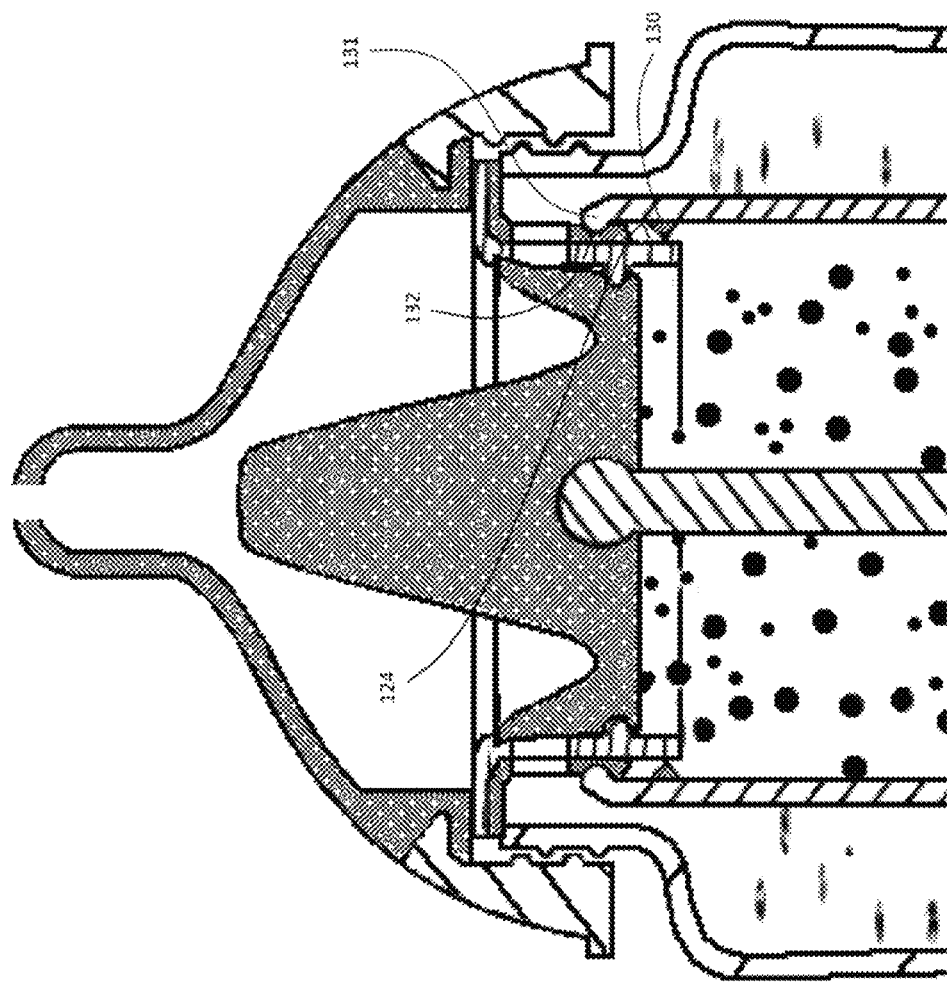

Piston 122 may comprise rod 34, ball 36 and a base 138 and may be placed inside of canister 120, as shown in FIG. 6B.

Figure 6C:
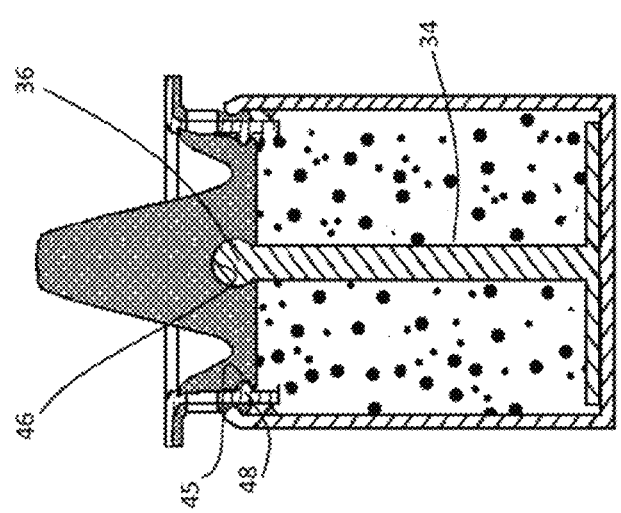

With piston 122 inside of canister 120, powder 50 may be added and flexible cap 24 may be placed onto the canister-ring combination. As in the previous embodiment and as shown in FIG. 6C, when the user presses flexible cap 24 into the ring-canister combination, ball-shaped indentation 46 may snap onto ball 36, thereby to hold it, and rod 34, in place. At generally the same time, ring-shaped indentation 45 may snap onto inwardly-protruding neck ring 48. FIG. 6D shows a blow up of the upper section of container 112 within bottle 10.

Since canister 120 is closed, the powder isn't released from the bottom of container 112. Instead, as shown in FIG. 6E, canister 120 may disconnect from ring 124 when flexible cap 24 is pressed downward.

Reference is now made to FIGS. 7A, 7B, 7C and 7D which illustrate a further alternative embodiment of the present invention.

In this embodiment, the powder container, labeled 212 in the expanded view of FIG. 7A, may comprise an open-ended canister 220, a piston 222 and flexible cap 24. In this embodiment, open-ended canister 220 may not include flexible ring 33 of FIG. 2. Instead, piston 222 may comprise a base 228 and flexible sealing elements 230, such as two rubber or silicone rings 232, one on top of each other. Sealing rings 232 may have a round or a triangular cross-section, as desired.

Open-ended canister 220 may include a protruding ring 234 at the bottom thereof, onto which sealing rings 232 may rest (as shown in FIG. 7B). When in place, base 228 may provide a bottom to canister 220 and sealing rings 232 may rub against the inner wall of open-ended canister 220, thereby sealing base 228 to the bottom of canister 220.

The remaining elements of powder container 212 may be similar to those of the first embodiment of FIGS. 1-5 and may operate in a similar manner. FIG. 7C shows powder container 212 in its sealed state, with cap 24 on piston 222 in place.

FIG. 7D shows powder container 212 within bottle 10, after cap 24 is pushed into open-ended canister 220. Piston 222 is pushed past protruding ring 234, to spill powder 50 into liquid 60 in bottle 10.

Reference is now briefly made to FIG. 8, which illustrates a further embodiment, similar to that of FIG. 7, but without rod 34 of piston 222 and with a cap 224 without ball-shaped indentation 46. The remaining elements may be the same.

In this embodiment, base 228 may be connectable to the bottom of open-ended canister 220, as in the previous embodiment. However, in this embodiment, powder 50 may provide the connection between cap 224 and base 228, rather than rod 34, and therefore, when cap 224 is pushed into canister 220, powder 50 may push base 228 out of canister 220, thereby releasing powder 50.

Figure 9B:
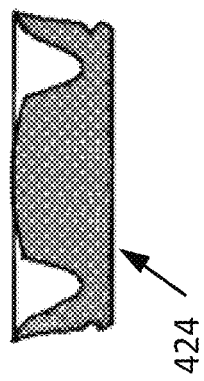
FIGS. 9A and 9B are schematic illustrations of alternative embodiments of a cap, useful in the previous embodiments.
Figure 9A:
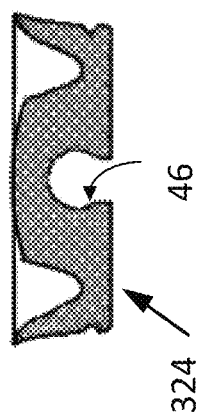

Reference is now made to FIGS. 9A and 9B, which provide alternative embodiments for cap 24 which may be operative for the embodiments described hereinabove, where cap 324 of FIG. 9A has ball-shaped indentation 46 and is operative for the embodiments of FIGS. 1-7 and cap 424 of FIG. 9B, without ball-shaped indentation 46, is operative for the embodiment of FIG. 8. This embodiment may be suitable for bottles which don't have nipples (such as a thermos or a bottle of antibiotics).

Caps 324 and 424 may be flat, rather than conic, so as to fit within a bottle which has a flat cover. When the user may want to mix the powder with the liquid in the bottle, the user may remove the cover of the bottle and may push down flat cap 324/424 into its canister 20/120/220.

In an alternative embodiment, the cap may be formed of a hard material, rather than a flexible one. In this embodiment, canister 20/120/220 may include a ring of flexible material into which the hard cap may be inserted, so as to provide a strong seal therebetween.

In a further alternative embodiment, the spilling mechanism may be any suitable mechanism which will cause powder 50 to spill out. For example, the connection between cap 24 (whether hard or flexible) and rod 34 may be through any suitable snap arrangement rather than via ball 36, or rod 34 may have a flat surface touching cap 24 or any other mechanism.

It will be appreciated that the present invention stores powder or liquid in a removable container which may sit inside bottle 10 and may be sealed from liquid 60 within bottle 10. The removable container may comprise multiple elements which are releasably connected to form the container and a release mechanism to release the connections when pushed by the cap, thereby releasing the powder into the bottle.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A removable container for powder or liquid, the container comprising:
    a housing to hang within a bottle on a rim of said bottle and capable of storing said powder or liquid within said bottle, said housing being sealed from a precursor liquid held within said bottle;
    a spilling mechanism to enable said powder or liquid to spill out of said housing and into said precursor liquid; and
    a bypass element to provide said precursor liquid out of said bottle without mixing with said stored powder or liquid,
    wherein said housing comprises:
    an open-ended canister having an upper lip to which a flexible cap is snap-fittable, said upper lip to rest on said rim; and
    a bottom snap-fittable into a lower end of said open-ended canister,
    and wherein said spilling mechanism also comprises a rod, integrally formed with said bottom, which rod is snap-fittable into said flexible cap,
    wherein, said bottom is pushably releasable from said open-ended canister when pushed, via said rod, by said flexible cap thereby to release said powder or liquid into said bottle.

2. The removable container according to claim 1 and wherein said bypass element provides an exit path for steam.

3. The removable container according to claim 1 and also comprising circulation elements to enable said precursor liquid to mix with said powder or liquid.

4. The removable container according to claim 1 wherein said bottle comprises a nipple and wherein said spilling mechanism comprises said flexible cap shaped to be pressed down through said nipple.

5. The removable container according to claim 1 and wherein said powder or liquid is one of the following: a nutritional formula, a powdered chemical and a medicine.

6. The removable container according to claim 1 and also comprising a plurality of flexible sealing rings to seal said bottom to said open-ended canister.

7. The removable container according to claim 6 and wherein said flexible sealing rings are connectable to said bottom.

8. A removable container for powder or liquid, the container comprising:
    an open-ended canister capable of sealingly storing an amount of powder or liquid, said canister at least comprising an upper lip to rest on a rim of a bottle;
    a flexible cap snap-fittable into an upper end of said canister, said flexible cap having an indentation therein;
    a bottom, having flexible sealing rings, said bottom snap-fittable into a lower end of said open-ended canister,
    a rod, integrally formed with said bottom at one end thereof and comprising a ball at another end thereof, wherein said ball is snap-fittable into said indentation of said flexible cap,
    wherein, said bottom is pushably releasable from said open-ended canister when pushed, via said rod, by said flexible cap.

* * * * *